United States Patent
Sato et al.

(10) Patent No.: US 7,194,507 B2
(45) Date of Patent: Mar. 20, 2007

(54) METHOD AND APPARATUS FOR SETTING COMMUNICATION PARAMETER IN INFORMATION TERMINAL

(75) Inventors: Hidekazu Sato, Tokyo (JP); Hidekazu Fukai, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 602 days.

(21) Appl. No.: 10/069,831

(22) PCT Filed: Jun. 27, 2001

(86) PCT No.: PCT/JP01/05493

§ 371 (c)(1),
(2), (4) Date: Feb. 26, 2002

(87) PCT Pub. No.: WO02/01371

PCT Pub. Date: Jan. 3, 2002

(65) Prior Publication Data

US 2002/0124088 A1    Sep. 5, 2002

(30) Foreign Application Priority Data

Jun. 29, 2000    (JP)    ............... 2000-196847

(51) Int. Cl.
*G06F 15/16*    (2006.01)

(52) U.S. Cl. ............ 709/203; 709/227; 709/200; 705/5

(58) Field of Classification Search ............... 709/227, 709/203, 200
See application file for complete search history.

(56) References Cited

U.S. PATENT DOCUMENTS

| 5,812,819 | A | 9/1998 | Rodwin et al. | ............. 395/500 |
| 5,862,339 | A | 1/1999 | Bonnaure et al. | ...... 395/200.57 |
| 6,446,043 | B1 * | 9/2002 | Matsumoto et al. | ........... 705/8 |
| 6,529,489 | B1 * | 3/2003 | Kikuchi et al. | ............. 370/331 |
| 6,581,100 | B1 * | 6/2003 | Durin et al. | ................. 709/230 |
| 6,694,350 | B2 * | 2/2004 | Kurashima et al. | ......... 709/203 |

FOREIGN PATENT DOCUMENTS

| JP | H06-259394 A | 9/1994 |
| JP | H07-175547 | 7/1995 |
| JP | H08-272721 A | 10/1996 |
| JP | 9-149073 | 6/1997 |
| JP | 2000-148637 | 5/2000 |
| JP | 2001-297047 | 10/2001 |

* cited by examiner

*Primary Examiner*—David Wiley
*Assistant Examiner*—Kyung Hye Shin
(74) *Attorney, Agent, or Firm*—Brinks Hofer Gilson & Lione

(57) ABSTRACT

A communication parameter delivery server 50b has communication parameters necessary for making each of information terminals 13, 23 and 33 have a dial-up IP connection service. The server 50b delivers the communication parameters via each of networks 12, 22 and 33 responsively to a request from each of the information terminals 13, 23 and 33. The delivered communication terminals are set to Internet connection software installed in each of the information terminal 13, 23 and 33.

19 Claims, 9 Drawing Sheets

```
Content-type : application/autoconf

DialupNumber : #1111

DNSIAddress1 : 210.229.247.001

DNSIAddress2 : 210.229.247.002

SmtpServerName : smtp.abc.ne.jp

PopServerName : pop.abc.ne.jp

ImapServerName : imap.abc.ne.jp

WebDefaltPageURL : http://www.abc.ne.jp

UserID : user00123

UserPassword : xyz111

DialupType : 1

MailUserID : user00123

MailAddress : user00123@abc.ne.jp

MailPassword : opq333

MailProtocol : pop3
```

FIG. 4

| ORIGINATOR NUMBER | CONTENTS OF COMMUNICATION PARAMETERS | VALUES OF COMMUNICATION PARAMETERS |
|---|---|---|
| 090-3111-1111 | USER ID | user00123 |
| | PASSWORD | ghi321 |
| | PORTABLE DEVICE TYPE CODE | 1 |
| | MAIL ID | user00123 |
| | MAIL ADDRESS | user00123@abc.ne.jp |
| | MAIL PASSWORD | opq333 |
| | MAIL PROTOCOL | IMAP4 |
| 090-3111-1112 | USER ID | user00220 |
| | PASSWORD | xyz111 |
| | PORTABLE DEVICE TYPE CODE | 3 |
| | MAIL ID | user00220 |
| | MAIL ADDRESS | user00220@abc.ne.jp |
| | MAIL PASSWORD | xyz222 |
| | MAIL PROTOCOL | POP3 |
| 090-3111-1113 | ･･････ | ･･････ |
| | ･･････ | ･･････ |
| | ･･････ | ･･････ |
| | ･･････ | ･･････ |
| | ･･････ | ･･････ |
| | ･･････ | ･･････ |
| | ･･････ | ･･････ |
| | ･･････ | ･･････ |

FIG. 5

INTERNET CONNECTION SOFTWARE SF1

| NAMES OF COMMUNICATION PARAMETERS | VALUES OF COMMUNICATION PARAMETERS |
|---|---|
| Content-Type | application/autoconf |
| DialupNumber | #1111 (CELLULAR PHONE NETWORK)<br>#2222 (MOBILE PACKET COMMUNICATION NETWORK)<br>#3333 (PERSONAL HANDYPHONE SYSTEM NETWORK) |
| DNSIAddress1 | 210.229.247.001 |
| DNSIAddress2 | 210.229.247.002 |
| SmtpServerName | smtp abc ne jp. |
| PopServerName | pop abc ne jp. |
| ImapServerName | imap abc ne jp. |
| WebDefaltPageURL | http://www abc ne jp. |
| UserID | %%USER ID%% |
| UserPassword | %%PASSWORD%% |
| DialupType | %%PORTABLE DEVICE TYPE CODE%% |
| MailUserID | %%MAIL USER ID%% |
| MailAddress | %%MAIL ADDRESS%% |
| MailPassword | %%MAIL PASSWORD%% |
| MailProtocol | %%MAIL PROTOCOL%% |

INTERNET CONNECTION SOFTWARE SF2

| NAMES OF COMMUNICATION PARAMETERS | VALUES OF COMMUNICATION PARAMETERS |
|---|---|
| Content-Type | application/autoconf |
| DialupNumber | #1111 (CELLULAR PHONE NETWORK)<br>#2222 (MOBILE PACKET COMMUNICATION NETWORK)<br>#3333 (PERSONAL HANDYPHONE SYSTEM NETWORK) |
| DNS | 210.229.247.001 |
| DNS | 210.229.247.002 |
| Smtp | smtp abc ne jp. |
| Pop | pop abc ne jp. |
| WebDefaltURL | http://www abc ne jp. |
| UserID? | %%USER ID%% |
| Password? | %%PASSWORD%% |
| DialupType? | %%PORTABLE DEVICE TYPE CODE%% |
| MailAddress? | %%MAIL USER ID%% |
| MailUserID? | %%MAIL ADDRESS%% |
| MailPassword? | %%MAIL PASSWORD%% |
| MailProtocol? | %%MAIL PROTOCOL%% |

FIG. 6

```
Content-type : application/autoconf

DialupNumber : #1111
DNSIAddress1 : 210.229.247.001
DNSIAddress2 : 210.229.247.002
SmtpServerName : smtp.abc.ne.jp
PopServerName : pop.abc.ne.jp
ImapServerName : imap.abc.ne.jp
WebDefaltPageURL : http://www.abc.ne.jp
UserID : user00123
UserPassword : xyz111
DialupType : 1
MailUserID : user00123
MailAddress : user00123@abc.ne.jp
MailPassword : opq333
MailProtocol : pop3
```

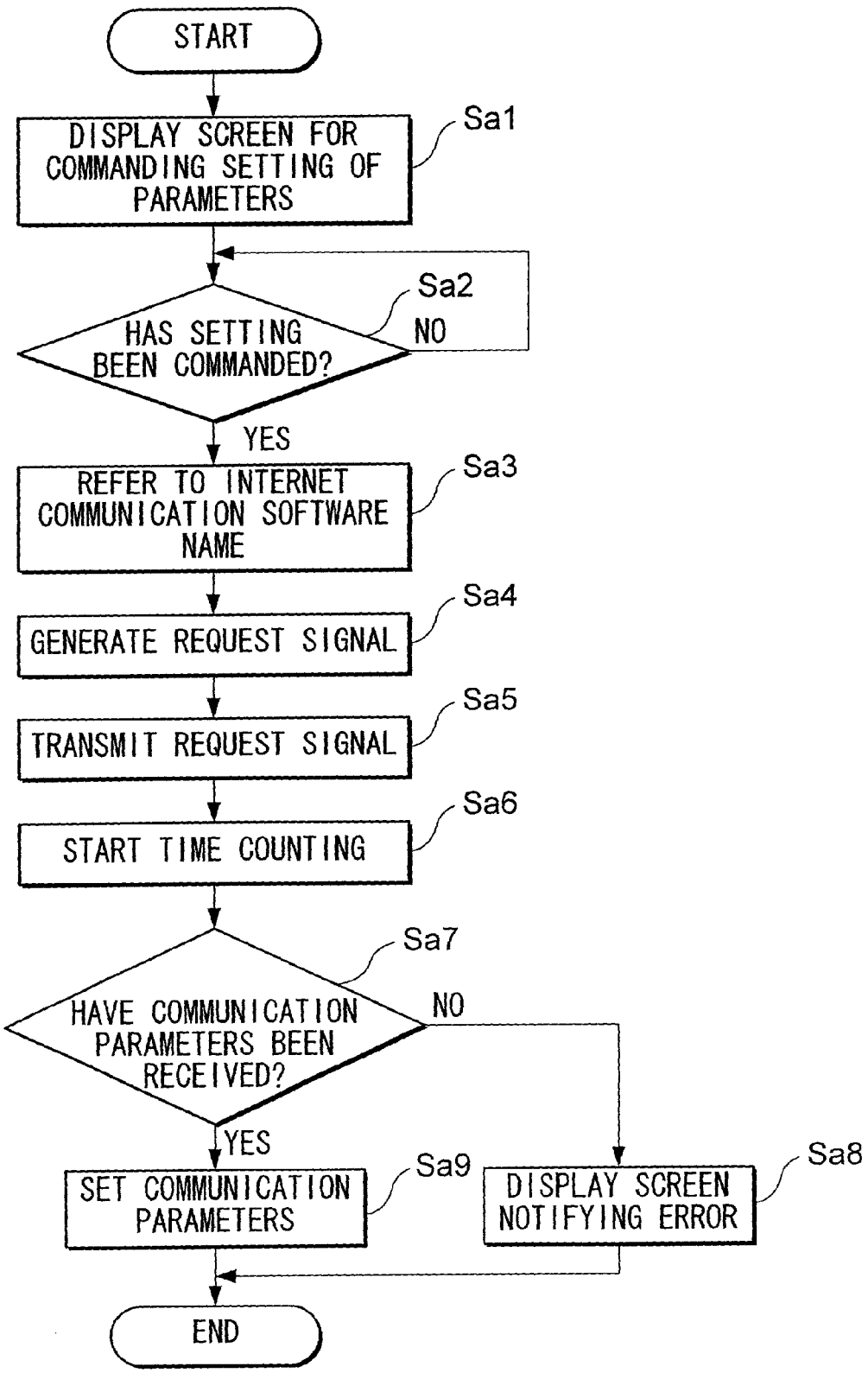

METHOD AND APPARATUS FOR SETTING COMMUNICATION PARAMETER IN INFORMATION TERMINAL

DESCRIPTION

1. Technical Field

The present invention relates to method and apparatus for setting a communication parameter for an information terminal to obtain service through a computer network.

2. Background Art

Web service and E-mail service using computer networks such as the Internet are popular.

In order for a user to obtain such a service, the user's terminal should be connected to the Internet through a so-called provider. In this case, communication parameters required to obtain the above-mentioned service through the provider should be set to Internet connection software installed in the user's terminal. These communication parameters include the telephone number of an access point at which the provider relays communication connections, the address of a DNS (Domain Name System) server, the user's mail address, and the name of a mail server.

By the way, different communication parameters are required when user terminals execute different types of Internet connection software products or when users have different circumstances. For example, there is a case in which the notations of the DNS address are different among the different Internet connection software products. Moreover, user's mail addresses are different user by user. Therefore, a user has to do complicated operation, i.e., reading the manual of the Internet connection software and setting the communication parameters which are adapted to the type of software concerned, user's own attributes, and others to the software.

DISCLOSURE OF THE INVENTION

The present invention has been made under such circumstances and has an object to provide a method and apparatus enabling a user to easily set a suitable communication parameter to the software executed by the user terminal.

In order to achieve the object, the present invention provides a communication parameter setting method comprising the steps of: transmitting from an information terminal a request signal for requiring a communication parameter to obtain service through a computer network to a server storing the communication parameter; receiving by the server the request signal; transmitting from the server to the information terminal the communication parameter stored in the server in response to the received request signal; receiving the transmitted communication parameter by the information terminal; and setting by the information terminal the received communication parameter to communication software installed in the information terminal.

The present invention enables a user to set communication parameters to communication software in compliance with the type of communication software and/or user's attributes with only simplified operations, even if concrete communication parameters are unknown to the user.

In a preferred embodiment of the invention, in the step of transmitting the request signal, software identification information to specify the communication software is transmitted together with the request signal, in the step of receiving the request signal, the transmitted software identification information is received together with the transmitted request signal, and in the step of transmitting the communication parameter, a communication parameter corresponding to the received software identification information is extracted among communication parameters stored in the server, and the extracted communication parameter is transmitted to the information terminal.

In another preferred embodiment, in the step of transmitting the request signal, user identification information specifying a user of the information terminal is transmitted together with the request signal, in the step of receiving the request signal, the transmitted user identification information is received together with the transmitted request signal, and in the step of transmitting the communication parameter, a communication parameter corresponding to the received user identification information is extracted among communication parameters stored in the server, and the extracted communication parameter is transmitted to the information terminal.

The user identification information is, for example, identification information to specify a communication apparatus used by the information terminal to communicate with the server.

In this case, the communication apparatus is, for example, a cellular phone served by a portable telephone network.

The present invention further provides an information terminal comprising: a transmitter for transmitting to a server a request signal requiring communication parameters to be set to a communication software installed in the information terminal to connect with a computer network; a receiver for receiving the communication parameter transmitted from the server in response to the transmitted request signal; and setting means for setting the received communication parameter to the communication software.

In a preferred embodiment, the transmitter transmits software identification information to specify the communication software together with the request signal.

In another preferred embodiment, the transmitter transmits user identification information to specify a user of the information terminal together with the request signal.

The present invention further provides a server comprising: a memory for storing communication parameters to obtain services through a computer network; a receiver for receiving a request signal requiring a communication parameter for an information terminal to obtain service through the computer network, when the information terminal transmits the request signal; extracting means for extracting the communication parameter from the memory in response to the received request signal; and transmitter for transmitting the extracted communication parameter to the information terminal.

In a preferred embodiment, the memory stores communication parameters corresponding to software identification information to specify the communication software, the receiver receives the software identification information transmitted together with the request signal from the information terminal, and the extracting means extracts the communication parameter corresponding to the received software identification information.

In another preferred embodiment, the memory stores communication parameters corresponding to user identification information to specify a user of the information terminal, the receiver receives the user identification information transmitted together with the request signal from the information terminal, and the extracting means extracts the communication parameter corresponding to the received user identification information.

The working of the present invention includes not only the use of the above-described method for setting communication parameter, the production of the above-described information terminal or server, or the transfer of the same, but also the following act. First, the present invention can be worked as the distribution of a program which the information terminal executes to receive the communication parameter from the server and set the parameter to the communication software to ordinary users through a electric communication circuit or the distribution of recording medium storing such a program to ordinary users. Second, the present invention can be worked as the distribution of a program which the server executes to transmit an appropriate communication parameter to the information terminal in response to the request signal to ordinary users through a electric communication circuit or the distribution of recording medium storing such a program to ordinary users.

BRIEF DESCRIPTION OF THE DRAWINGS

FIG. 4 is a view illustrating a format that exemplifies contents stored in a user information memory part of the communication parameter delivery server in the embodiment.

FIG. 5 is a view illustrating a format that exemplifies contents stored in a template information memory part of the communication parameter delivery server in the embodiment.

FIG. 6 exemplifies communication parameters transmitted from the communication parameter delivery server to the information terminal in the embodiment.

FIG. 7 is a flowchart showing the procedures of a communication parameter setting program executed by a CPU of the information terminal in the embodiment.

BEST MODE FOR CARRYING OUT THE INVENTION

With reference to drawings, embodiments of the present invention will be explained. However, the present invention is not limited to the embodiments, but variations maybe made within the scope of technical concepts of the present invention.

A: Configuration (1) Entire Configuration of Network

Figure 1:
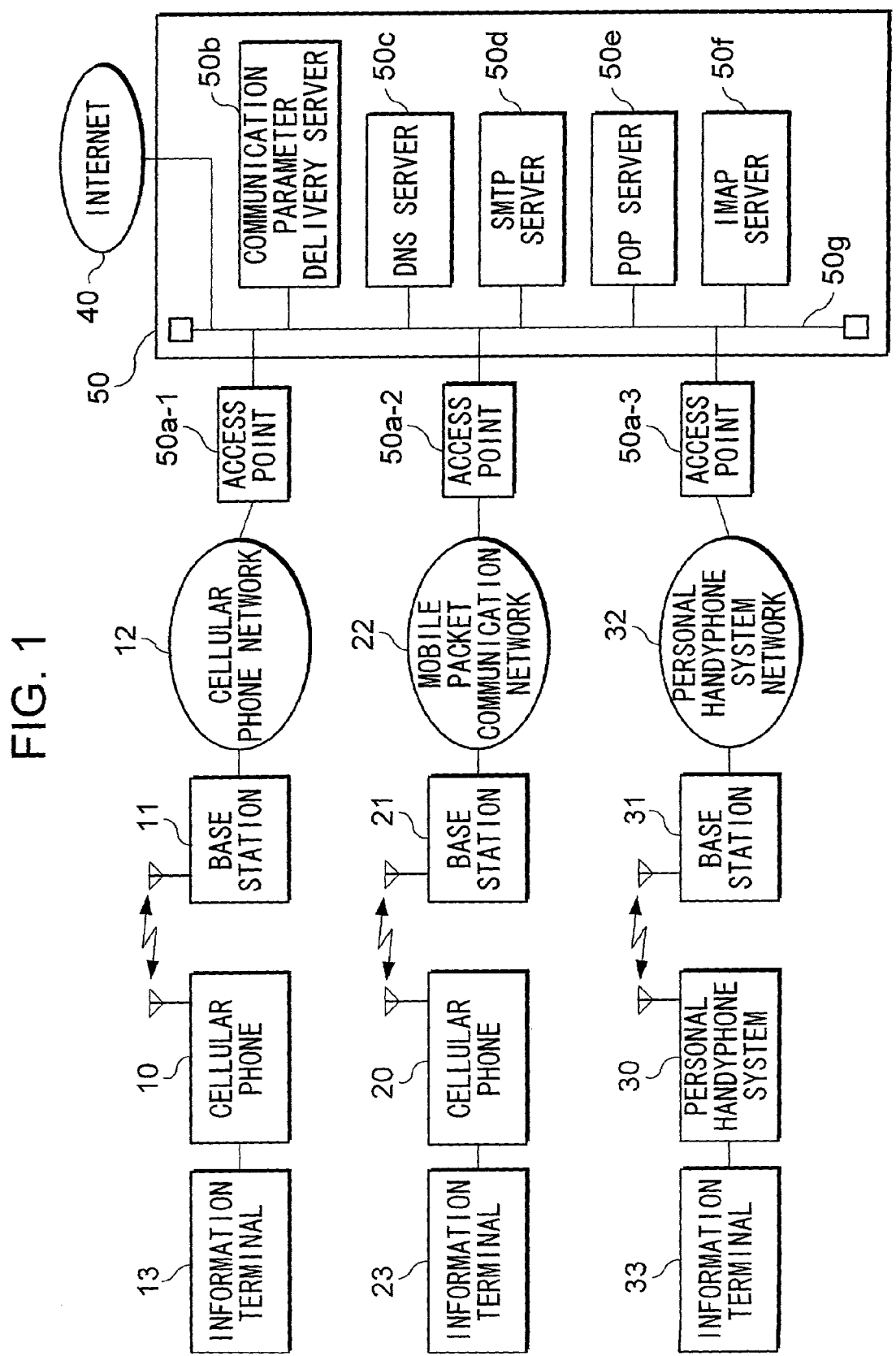
FIG. 1 is a block diagram showing the entire configuration of a network according to an embodiment of the present invention.

FIG. 1 is a block diagram showing the whole network configuration of an embodiment. In this figure, a reference 10 designates a well-known cellular phone served by a cellular-phone network 12 such as a PDC (Personal Digital Cellular) network. The cellular phone 10 can perform wireless data communication by transmitting and receiving radio signals to and from a base station 11 of the cellular-phone network 12.

A reference 13 designates an information terminal, such as a PDA (Personal Digital Assistants) and a notebook-sized personal computer. Both of the information terminal 13 and the cellular phone 10 are connected to each other by inserting a digital data communication card connected to the cellular phone 10 into a not-shown card slot equipped with the information terminal 13. The information terminal 13 performs data communication at, for example, a maximum transmission speed of 9.6 kbps through the cellular-phone network 12 by using the radio communication function of the cellular phone 10.

A reference 20 designates a well-known cellular phone served by a mobile packet communication network 22. The cellular phone 20 transmits and receives radio signals to and from a base station 21 of the mobile packet communication network 22, so that the cellular phone obtains packet data transmission service of the mobile packet communication network 22.

FIG. 1 shows a configuration in which the cellular-phone network 12 and the mobile packet communication network 22 are depicted as different communication networks, but they physically share the same network facilities.

A reference 23 represents an information terminal such as PDA, like the information terminal 13. The information terminal 23 is connected to the cellular phone 20 through a not-shown digital data communication card. The information terminal 23 uses a packet communication function of the cellular phone 20 to perform packet data communication at a maximum transmission speed of 22.8 kbps via the mobile packet communication network 22.

A reference 30 designates a well-known personal handyphone system served by a personal handyphone system network 32 called as a PHS (Personal Handyphone System). The personal handyphone system 30 transmits and receives radio signals to and from a base station 31 of the personal handyphone system network 32, obtaining telephone call service of the personal handyphone system network 32.

A reference 33 designates an information terminal such as a PDA, like the information terminal 13. The information terminal 33 is connected to a personal handyphone system 30 through a not-shown PIAFS (PHS Internet Access Forum Standard) card. The information terminal 33 is able to perform data communication at a maximum transmission speed of 32 kbps or 64 kbps via the personal handyphone system network 32 by using the radio communication function of the personal handyphone system 30.

When making reference to the foregoing cellular phones 10 and 20 and personal handyphone system 30 in a generalized manner, without paying attention to individualities of the phones, they are referred to as portable devices 10, 20 and 30.

A reference 50 designates a center managed by a provider which provides dial-up IP connection service to the Internet 40 to the information terminals 13, 23, and 33, and includes a variety of servers 50b to 50f and a high-speed digital line 50g connecting those servers to each other. The center 50 is connected to the Internet 40 via a not-shown router, to the cellular-phone network 12 through an access point 50a-1, to the mobile packet communication network 22 through another access point 50a-2, and to the personal handyphone system network 32 through another access point 50a-3.

Each of the access points 50a-1 to 50a-3 is made up of devices including a router and access server, which are not shown, and relays connections for communication between each information terminal 13, 23 or 33 and the center 50.

For example, the information terminal 13 accesses to the center 50 by calling the access point 50a-1 via the cellular phone 10 and cellular-phone network 12, and obtains provider's dial-up IP connection service. Similarly, the information terminal 23 accesses to the center 50 by calling the access point 50a-2 via the cellular phone 20 and mobile packet communication network 22, and obtains dial-up IP connection service. Further, the information terminal 33 accesses to the center 50 by calling the access point 50a-3 via the personal handyphone system 30 and personal handyphone system network 32, and obtains dial-up IP connection service.

A reference 50b designates a communication parameter delivery server. This server 50b holds various parameters (hereinafter, referred to as communication parameters) required to make each information terminal 13, 23 or 33 obtains dial-up IP connection service and delivers the communication parameters through the networks 12, 22 or 32 in response to a request from the information terminal 12, 23 or 33. The communication parameters include a DNS (Domain Name System) address, a mail server name, a mail address, and others, which will be descried later.

A reference 50c designates a DNS server, which holds host names and IP addresses which are assigned to the information terminals 13, 23 and 33, the host names and IP addresses being correlated with each other, and the DNS server performs bi-directional conversion between the host names and IP addresses. The DNS server 50c functions as the primary DNS server, while there is also provided a secondary DNS server (not-shown) in the center 50, other than the primary DNS server 50c. The secondary DNS server duplicates contents memorized in the primary DNS server 50c at intervals, and serves as a buck-up server for the primary DNS server 50c which might be down.

A reference 50d designates a SMTP server that adopts a SMTP (Simple Mail Transfer Protocol), which transmits an electronic mail that has been transmitted from any of the information terminals 13, 23 and 33 to a destination of the mail via the Internet 40.

A reference 50e designates a POP server that adopts a POP3 (Post Office Protocol version 3). A reference 50f shows an IMAP server employing an IMAP4 (Internet Massage Access Protocol version 4). Both POP server 50e and IMAP server 50f cooperate to receive an electronic mail destined to the information terminals 13, 23 and 33 via the Internet 40 and deliver the mail to the destination.

(2) Configuration of Information Terminal

Figure 2:
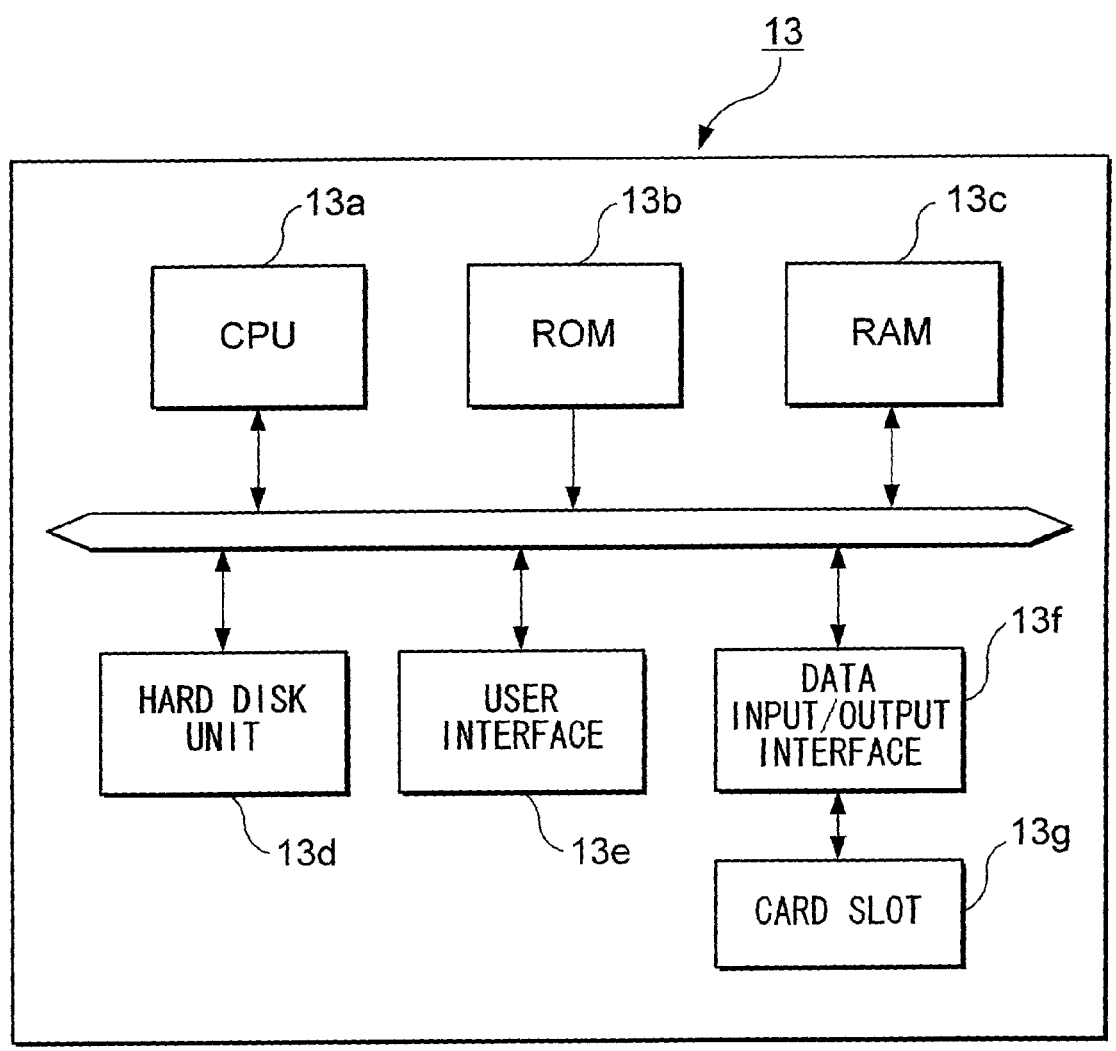
FIG. 2 is a block diagram showing the configuration of an information terminal used in the embodiment.

FIG. 2 is a block diagram showing the configuration of the information terminal 13. In this figure, the information terminal 13 has a CPU (Central Processing Unit) 13a, ROM (Read Only Memory) 13b, RAM (Random Access Memory) 13c, hard disk unit 13d, user interface 13e, data input/output interface 13f, and card slot 13g, which are mutually connected through a bus.

The ROM 13b is a read-only program memory. The CPU 13a reads control programs from the ROM 13b and executes them to control each component of the information terminal 13. The RAM 13c is used by the CPU 13a as a work area when the CPU executes control programs including various types of software which will be described later.

The hard disk unit 13d stores various types of software installed for the information terminal 13 and various kinds of information utilized by a user. Software stored in the hard disk unit 13d includes data communication software for communicating data through the cellular phone 10, known type of software such as Internet connection software for making a communication link to the Internet 40 via a provider, and communication parameter setting software (hereinafter, this is referred to as an "autoconf") for setting communication parameters to the Internet connection software.

The user interface 13e includes a display for displaying a variety of information, such as Web pages and electronic mails, and a key operation device used by a user to enter information.

The data input/output interface 13f is used for inputting and outputting data from and to external devices such as the cellular phone 10. Into the card slot 13g, a digital data communication card connected to the cellular phone 10 is inserted.

Like the information terminal 13 described above, the other information terminals 23 and 33 are provided with a CPU, ROM, RAM, hard disk unit, user interface, data input/output interface, and card slot, respectively. The functions of these components are the same as those described above, so their explanations are omitted.

(3) Configuration of Communication Parameter Delivery Server

Figure 3:
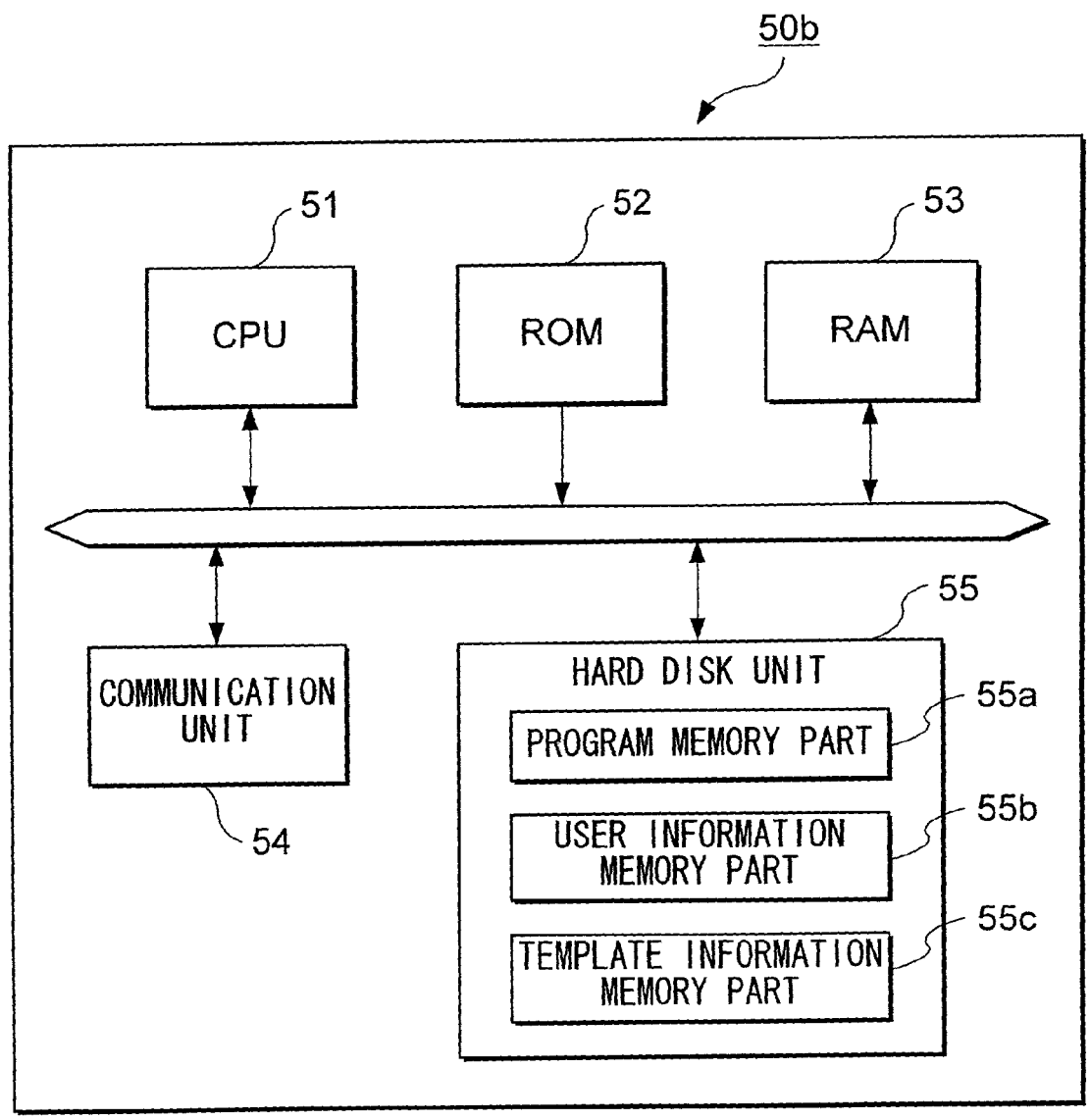
FIG. 3 is a block diagram showing the configuration of a communication parameter delivery server used in the embodiment.

FIG. 3 is a block diagram showing the configuration of the communication parameter delivery server 50b. As shown therein, the communication parameter delivery server 50b is provided with a CPU 51, ROM 52, RAM 53, communication unit 54, hard disk unit 55 which are mutually connected via a bus.

The ROM 52 is a read-only program memory. The CPU 51 reads control programs from the ROM 52 and executes them to control each component of the communication parameter delivery server 50b. The RAM 53 is used as a working area by the CPU 51 when the CPU executes various type of programs.

The communication unit 54 is connected to the high speed digital line 50g in the center 50, and transmits and receives data through the line.

The hard disk unit 55 has three memory areas, i.e., a program memory part 55a, user information memory part 55b, and template information memory part 55c. The program memory part 55a stores a communication parameter delivery program for delivering communication parameters to each of the information terminals 13, 23 and 33. The user information memory part 55b stores user information for each user. The user information is used as a communication parameter dependent on user's attributes. The template information memory part 55c stores templates which correlate communication parameter names with communication parameter values. The templates are prepared for the Internet connection software installed in each of the information terminals 13, 23 and 33. Each template defines communication parameters for the Internet connection software. The template will be detailed later.

The communication parameter delivery server 50b executes the communication parameter delivery program in response to a request from any of the information terminals 13, 23 and 33. Through processing of the program, the server 50b loads user information extracted from the user information memory part 55b onto a template extracted for the template information memory part 55c, then delivers the template including the user information as an electronic mail to any of the information terminals 13, 23 and 33 from which the request was issued.

(4) Memory Contents of User Information Memory

Contents stored in the user information memory part 55b will now be described.

FIG. 4 is a table exemplifying contents stored in the user information memory part 55b. As shown therein, the user information memory part 55*b* stores a variety of types of user information, i.e., a user ID, password, portable device type code, mail ID, mail address, mail password, and mail protocol, each user information being correlated with an originator number.

The originator number is a phone number assigned to each portable device 10, 20 or 30. A request signal transmitted to the communication parameter delivery server 50*b* from any of the information terminals 13, 23 and 33 via any of the portable devices 10, 20 and 30 has the originator number of the portable device which transmitted the request. Adding the originator number to the request is realized by a known originator number informing function owned by each portable device 10, 20 or 30, so details about its function will be omitted here. Using the originator number added to the request, as a retrieval key, the communication parameter delivery server 50*b* extracts user information corresponding to a user of information terminal 13, 23 or 33 which has transmitted the request signal.

The user's ID is an identification code used for identifying the user when the user obtains dial-up IP connection service by providers. The password is an authentication code used for user authentication when the user obtains the above connection service.

The portable device type code is identification showing which one of the portable devices 10, 20 and 30 is used by a user when obtaining the above connection service. The portable device type code having a communication parameter value "1" expresses the cellular phone 10, that having another value "2" expresses the cellular phone 20 capable of carrying out packet data communication, and that having another value "3" expresses the personal handy-phone system 30, respectively.

The mail ID is an identification to specify a user to whom electronic mail service is offered, and in this embodiment, the foregoing user ID is used as the mail ID. The mail address is an address assigned to each user obtaining the electronic mail service. The mail password is information used for user authentication when a user utilizes the electronic mail service. The mail protocol is information indicating which one of the mail protocols POP3 and IMAP4 is used by each information terminal 13, 23 or 33.

(5) Contents Stored in Template Information Memory Part

Contents stored in the template information memory part 55*c* will now be explained.

FIG. 5 exemplifies a format of contents stored in the template information memory part 55*c*. As shown therein, the template information memory part 55*c* memorizes templates assigned to each of sets of the Internet connection software. In each template, communication parameter names and the communication parameter values, which are comprehensible by each Intent connection software, are described. The template is added to an electronic mail by means of MIME (Multipurpose Internet Mail Extensions) when the mail is transmitted from the communication parameter delivery server 50*b* to any of the information terminals 13, 23 and 33.

Using the template for the Internet connection software SF1 shown in FIG. 5, as an example, each communication parameter will now be descried.

First, "Content-Type" is header information to specify the type of the MIME added to an electronic mail. Communication parameter values of "application/autoconf" that correspond to this "Content-Type" are used for commanding the activation of the communication parameter setting software "autoconf" installed in each of the information terminals 13, 23 and 33. That is, the information terminal 13, 23 or 33 which has received a MIME header "Content-type: application/autoconf" activates the communication parameter setting software "autoconf," and through the procedure of the software the information terminal set communication parameters which will successively be received to Internet connection software.

Communication parameters named "DialupNumber," "DNSIAddress1," "DNSIAddress2," "SmtpServerName," "PopServerName," "ImapServerName," "UserID," "UserPassword," "DialupType," "MailUserID," "MailAddress," "MailPassword," and "MailProtocol," all of which follow "Content-Type," are individually made up of a series of characters comprehensible as communication parameter names by Internet connection software SF1. In other words, these communication parameter names are inherent to each set of communication software. For example, Internet connection software SF1 differs from Internet connection software SF2 in the communication parameter names.

"DialupNumber" expresses the phone numbers of the access points 50*a*-1 to 50*a*-3, and "DialupNumber" having parameter value "#111" indicates the access point 50*a*-1 of the cellular-phone network12, that having "#222" indicates the access point 50*a*-2 of the mobile packet communication network 22, and that having "#333" indicates the access point 50*a*-3 of the personal handyphone system network 32.

"DNSIAddress1" is an IP address of the primary DNS server 50*c*, whilst "DNSIAddress2" is an IP address of the secondary DNS server not shown. In addition, "SmtpServerName" is the server name of the SMTP server 50*d*, "PopServerName" is the server name of the POP server 50*e*, "ImapServerName" is the server name of the IMAP server 50*f*.

Communication parameter values for the above communication parameter names of "DialupNumber" to "ImapServerName" are predetermined into common values, independently of types of Internet connection software and user's attributes.

The communication parameter values "%% user ID %%," "%% password %%," "%% portable device type code %%," "%% mail user ID %%," "%% mail address %%," "%% mail password %%," and "%% mail protocol %%," are respectively set for the communication parameter names "UserID," "UserPassword," "DialupType," "MailUserID," "MailAddress," "MailPassword," and "MailProtocol," These communication parameter values are replaced by values dependent on user's attributes.

This replacement will be performed as follows. First, as stated before, user information is extracted from the user information memory part 55*b* by using the originator number as a retrieval key. Then, a series of characters of any of the foregoing "%% user ID %%" to "%% mail protocol %%," which correspond to the extracted user information, are replaced by the extracted user information. For example, if a user ID of "user00123" is extracted from the user information memory part 55*b*, the "%% user ID %%" on the template is replaced by the "user00123."

FIG. 6 exemplifies communication parameters delivered to the information terminal 13 by the communication parameter delivery server 50*b*. In this figure, for example, "DialupNumber" corresponds to the portable device type code "1", which is obtained by retrieving the code in the user information memory part 55*b* by using, as a retrieval key, an originator number sent from the information terminal 13 and cellular phone 10, and provides "#1111" which is the phone number of the access point 50*a*-1 of the cellular phone network 12.

B : Operation

An operation of the present embodiment configured as above will now be described. First, when any of the information terminals 13, 23 and 33 requests the communication parameter delivery server 50b to deliver communication parameters, the communication parameter delivery server 50b delivers communication parameters to the information terminal which has requested. In the information terminal 13, 23 or 33, the delivered communication parameters are set to the Internet connection software.

Hereinafter, (1) one operation of requesting and setting of communication parameters carried out by the information terminals 13, 23 and 33 and (2) the other operation of delivering the communication parameters carried out by the communication parameter delivery server 50b will now be described separately.

(1) Requesting and Setting of Communication Parameters

FIG. 7 is a flowchart showing a flow of processing of a communication parameter setting program executed by the CPU 13a of the information terminal 13. FIGS. 8A, 8B, 8C, 8D and 8E exemplify a series of screens which are displayed on a monitor of the information terminal 13 during the above setting processing.

In FIG. 7, when a user operates a given key, the CPU 13a loads a communication parameter setting program from the hard disk unit 13d into the RAM 13c, and starts the execution of the program from step Sa1. At step Sa1, the CPU 13a displays a screen shown in FIG. 8A in order to urge a user to enter a command of setting communication parameters.

Then, the processing of the CPU 13a proceeds to step Sa2, wherein the CPU 13a scans the key operation panel and determines whether or not a key operation instructing the setting communication parameters has been made.

If such key operation is not found, the determination at step Sa2 is "No," then this determination will be repeated.

In contrast, the key operation instructing the setting is found, the determination at step Sa2 is "Yes" and the processing proceeds to step Sa3.

At step Sa3, the CPU 13a obtains the software name of an Internet connection software stored in the hard disk unit 13d. For instance, when the software is stored in the file format, the CPU 13a reads a file management table in which attribute information of files stored in the hard disk unit 13d is written, and obtains the software name of the Internet connection software. At both of this step Sa3 and the next step Sa4, the CPU 13a displays a screen shown in FIG. 8B.

The processing of the CPU 13a then proceeds to step Sa4. At this step Sa4, the CPU 13a produces a request signal requesting delivery of communication parameters. The request signal includes the software name of the Internet connection software obtained at Step Sa3.

The processing of the CPU 13a then proceeds to step Sa5. At this step Sa5, the CPU 13a commands the cellular phone 10 to call the access point 50a-1, connects the communication line to the center 50, and transmits the request signal generated at step Sa4 to the center 50. A phone number "#1111" to call the access point 50a-1 is entered by a user's key operation. Further, as stated before, when the cellular phone 10 transmits the request signal to the center 50, an originator number of the cellular phone 10 is added to the request signal.

Figure 8C:
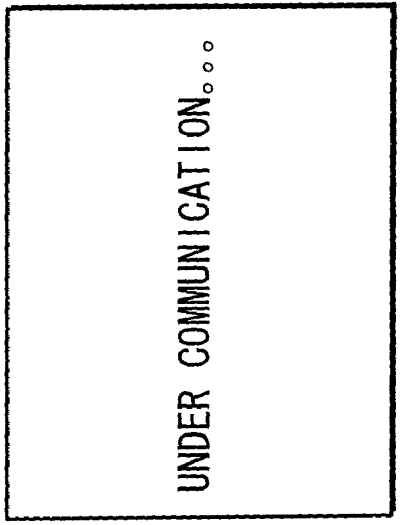
FIGS. 8A, 8B, 8C, 8D and 8E illustrate one set of examples each showing screens displayed on a display of the information terminal in the embodiment.
Figure 8B:

At step Sa5, the CPU13a displays a screen shown in FIG. 8C.

After the transmission of the request signal, the processing of the CPU 13a proceeds to step Sa6, where time counting is started. This time counting is prepared for executing timeout processing, which will be described later and is carried out when no communication parameter values have been received from the center 50 during a certain period of time.

Then, at step Sa7, the CPU 13a determines if the communication parameter values have been received or not within a certain period of time.

Figure 8E:
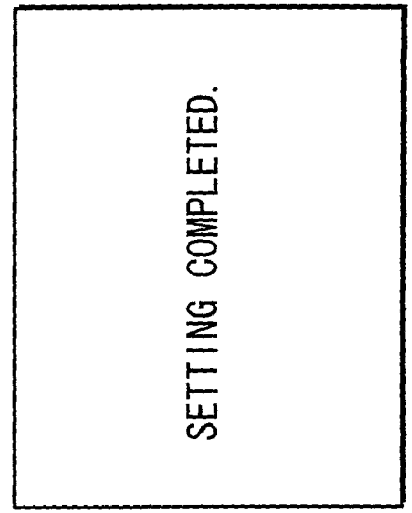
Figure 8A:
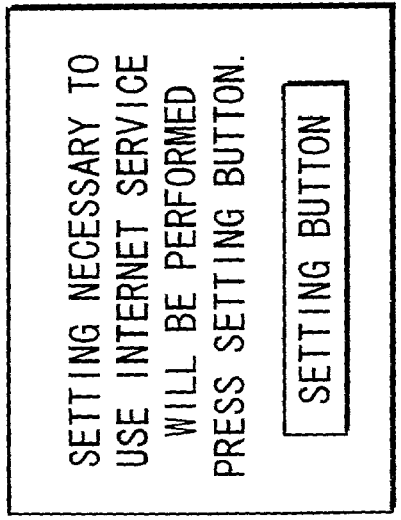
Figure 8D:
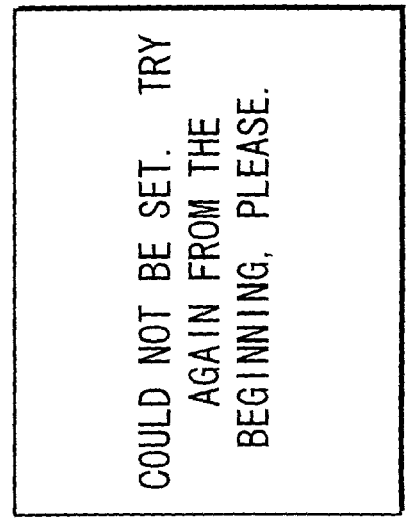

If the communication parameter values have not been received yet, the determination at step Sa7 becomes "No" and the processing proceeds to step Sa8 wherein an error screen as shown in FIG. 8D indicating the occurrence of the timeout error is displayed. The processing then terminates.

On the other hand, when the communication parameter values have been received within a certain period of time, the determination at step Sa7 becomes "Yes," so that the processing proceeds to step Sa9.

Then, at step Sa9, the CPU 13a sets the received communication parameter values to the Internet connection software. This setting is performed by writing the received communication parameter values at given locations in the Internet connection software.

After completing this setting, the CPU 13a displays a screen noticing the end of setting, as shown in FIG. 8E, and terminates the processing.

Figure 9:
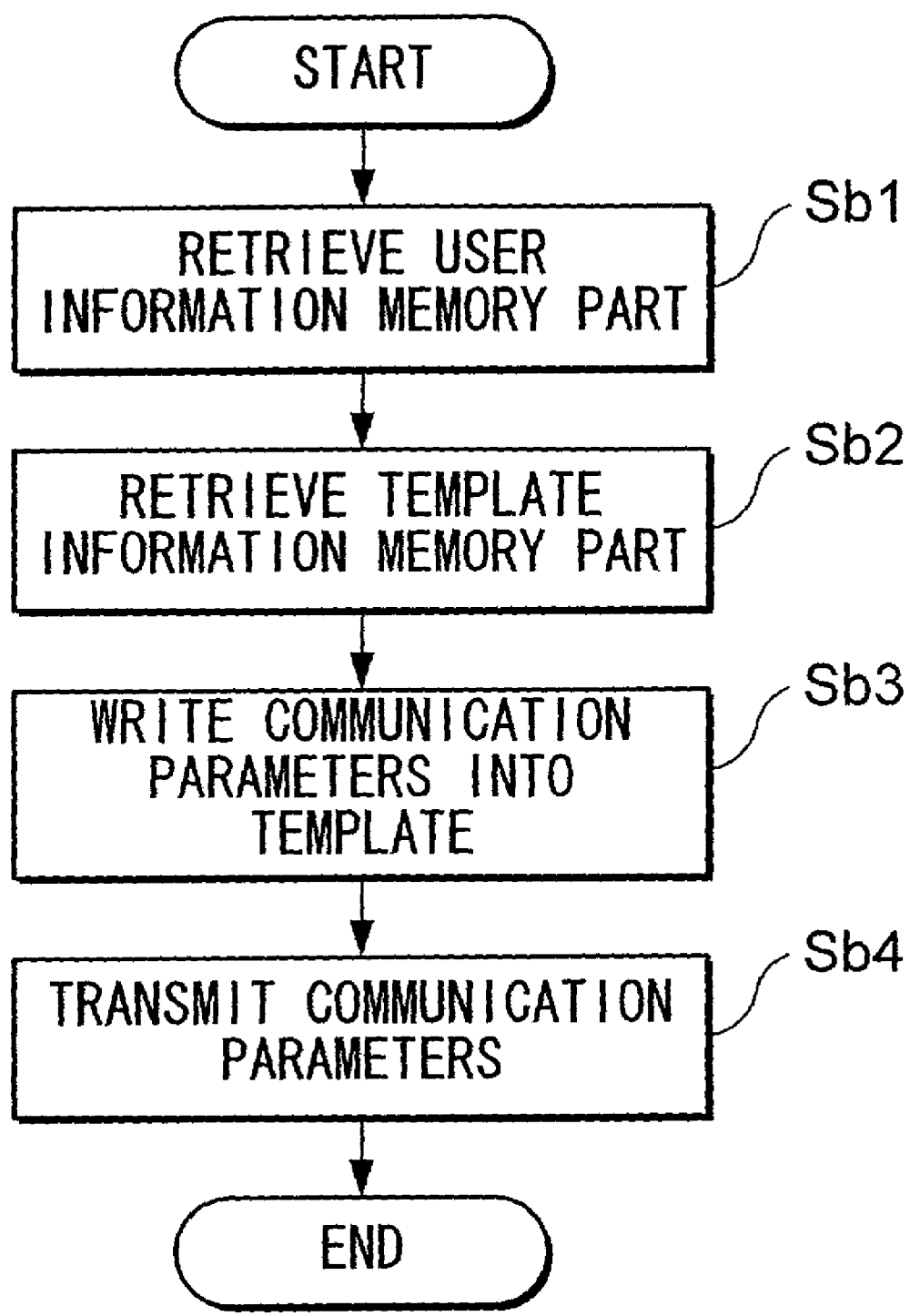
FIG. 9 is a flowchart showing the procedures of a communication parameter delivery program executed by a CPU of the communication parameter delivery server in the embodiment.

(2) Delivery of Communication Parameters in Communication Parameter Delivery Server 50b With reference to a flowchart shown in FIG. 9, the description will be given with respect to an operation in which communication parameters are delivered from the CPU 51 of the communication parameter delivery server 50b to the information terminal 13.

As stated before, the request signal for setting communication parameters is transmitted to the communication parameter delivery server 50b together with an originator number of the cellular phone 10. In response to this transmission, the CPU 51 of the communication parameter delivery server 50b activates a communication parameter delivery program, and starts the program from the processing of step Sb1 in FIG. 9. At step Sb1, the CPU 51 retrieves the user information memory part 55b of the hard disk unit 55 using the received originator number as a retrieval key, and acquires the user information corresponding to the key.

Then the processing proceeds to step Sb2. At step Sb2, the CPU 51 retrieves the template information memory part 55c of the hard disk unit 55 using the software name of the Internet connection software as a retrieval key, which is included in the received request number, and acquires the template corresponding to the key.

The processing of the CPU 51 then proceeds to step Sb3. At step Sb3, the CPU 51 substitutes the user information obtained at step Sb1 for series of characters of "%% user ID%%" to "%% mail protocol##" on the template obtained at step Sb2.

The processing of the CPU 51 then proceeds to step Sb4. At step Sb4, the CPU 51 adds, to an electronic mail destined for the cellular phone 10, the template in which the communication parameter values have been written, transmits the mail to its destination, and terminates the processing.

According to the foregoing embodiment, a user is able to set communication parameters to Internet connection software in compliance with the type of Internet connection software and/or user's attributes with only simplified operations, even if concrete communication parameter values are unknown to the user.

C : Modifications

As described before, the present invention is not limited to the above embodiment, but it is still possible to modify the embodiment as follow.

(1) As to Configurations of Information Terminal and Portable Device

In the above embodiment, the information terminals 13, 23 and 33 and the portable devices 10, 20 and 30 are configured in a manner that the digital data communication card or PIAFS card connected to the portable devices 10, 20 and 30 is inserted into the card slot 13g of the information terminals 13, 23 and 33, but the present invention is not confined to such a connection. For example, the digital data communication card or PIAFS card can be incorporated into either the information terminal 13 (23 and 33) or the portable device 10 (20 and 30), with each information terminal 13 (23 and 33) and each portable devices 10 (20 and 30) connected to each other through a dedicated cable.

Further, the information terminals 13, 23 and 33 in which Internet connection software is installed and the portable devices 10, 20 and 30 are configured as separate units in the foregoing embodiment, but the present invention is not restricted such a configuration. Both of the information terminal 13 (23 and 33) and the portable device 10 (20 and 30) can be united physically. That is, the information terminal may include a wireless data communication function which can be used to connect to the provider's center 50.

Still further, the data transmission path between the information terminals 13, 23 and 33 and the center 50 is not limited to the wireless path such as a cellular phone network, but a wired path such as a fixed-line telephone network. In this case, a fixed-line telephone can be used instead of the portable device 10, 20 or 30.

(2) Types of Communication Parameters

The types of communication parameters delivered from the communication parameter delivery server 50b to the information terminal 13, 23 or 33 are not limited to those described in the embodiment. Alternatively, various other communication parameters such as the name of proxy server can be included.

(3) Form of Internet

The foregoing embodiment has used the Internet as an object to which information terminals are communicably connected. Instead, a computer communication network such as Intranet can be adopted.

The invention claimed is:

1. A method of enabling a communication terminal to receive communication services via a network, the method comprising:

requesting a plurality of communication parameters from a server with a communication terminal via a mobile phone connected to the communication terminal, wherein the communication parameters are requested for use in communication software stored in the communication terminal that is enabled to communicate over a network after being populated with the requested communication parameters, notifying the server of a telephone number allotted to the mobile phone used by the communication terminal to request the communication parameters, the server extracting from a plurality of communication parameters, each of which is stored in association with a telephone number, communication parameters stored in association with the notified telephone number that include individual user specific identification information of a user of the mobile phone, and communication software configuration values, transmitting the extracted communication parameters from the server to the communication terminal, receiving at the communication terminal via the mobile phone the extracted communication parameters, and the communication terminal writing the extracted communication parameters into predetermined locations in the communication software stored in the communication terminal in order to configure the communication software to enable receipt by the communication terminal of communication services via a network.

2. The method according to claim 1, wherein the requesting step comprises transmitting from the communication terminal to the server a software identifier indicative of the communication software stored by the communication terminal, and the extracting step comprises the server extracting from the plurality of stored communication parameters a communication parameter stored in association with the notified telephone number and with the transmitted software identifier.

3. The method according to claim 1, wherein each of a plurality of networks serve a group of mobile phones, and the extracting step comprises, the server extracting an access point of a network that serves the mobile phone as one of the communication parameters, wherein the access point is identified by the notified telephone number.

4. The method according to claim 2, wherein the server is operable to store a plurality of templates each of which corresponds to one of a plurality of software identifiers and comprise a communication parameter name and a communication parameter value, and wherein the server comprises a user data storing unit operable to store a communication parameter value of a user of the mobile phone in association with a telephone number of the mobile phone, and the extracting step comprises the server specifying a template from among the plurality of templates that corresponds to the software identifier transmitted from the communication terminal.

5. The method according to claim 4, wherein the extracting step further comprises, extracting a communication parameter value that is not contained in the specified template from the user data storing unit on the basis of the telephone number of the mobile phone, and editing the specified template by adding the extracted communication parameter value to the specified template.

6. The method according to claim 5, wherein the transmitting step comprises transmitting the edited template from the server to the communication terminal via the mobile phone.

7. A method of enabling a communication terminal to receive communication services via a network, the method comprising:

a communication terminal requesting, via a communication device connected to the communication terminal, a set of communication parameters for use in communication software stored on the communication terminal, wherein the set of communication parameters are requested from a server, notifying the server of an identifier of the communication software and an identifier allotted to the communication device, the server extracting from a plurality of communication parameters, each of which is stored in association with one of an identifier of a communication device or an identifier of communication software, those communication parameters stored in association with the notified identifier of the communication software and the notified identifier allotted to the communication device, wherein the communication parameters comprise individual user specific identification information of a user of the mobile phone, and communication software configuration values, transmitting the extracted communication parameters from the server to the communication terminal, receiving the communication parameters transmitted from the server at the communication terminal via the communication device, and writing the received communication parameters into the communication software stored in the communication terminal in order to configure the communication software to enable receipt by the communication terminal of communication services via a network.

8. A server for enabling a communication terminal to receive communication services via a network, the server comprising:

a storing unit configured to store a plurality of combinations of a first communication parameter and a telephone number of a mobile phone, and a plurality of combinations of a second communication parameter and a software identifier indicative of communication software configurable in a communication terminal to enable communication over a network, a receiving unit configured to receive from a communication terminal a request for a plurality of communication parameters, a software identifier of communication software stored in the communication terminal, and a telephone number allotted to a mobile phone to be used by the communication terminal to transmit the request, an extracting unit configured to extract from the storing unit a first communication parameter corresponding to the telephone number received by the receiving unit, and a second communication parameter corresponding to the software identifier received by the receiving unit, wherein the first communication parameter comprises individual user specific identification information of a user of the mobile phone, and the second communication parameter comprises communication software configuration values, and a transmitting unit configured to transmit the extracted first and second communication parameters for receipt by the communication terminal.

9. The server according to claim 8, wherein each of a plurality of networks is configured to serve a group of mobile phones, and the extracting unit is configured to extract an access point of a network that serves the mobile phone as another communication parameter that corresponds to the telephone number.

10. The server according to claim 8, wherein the storing unit is further configured to store a plurality of templates each of which corresponds to a software identifier and comprises a combination of a communication parameter name and a communication parameter value.

11. The server according to claim 8, wherein the extracting unit is further configured to specify a template from among the plurality of templates that corresponds to the software identifier transmitted from the communication terminal.

12. The server according to claim 11, wherein the extracting unit is further configured to search, on the basis of the telephone number of the mobile phone, for a communication parameter value that is not contained in the specified template, and edit the specified template by addition of the searched communication parameter value to the specified template.

13. The server according to claim 12, wherein the transmitting unit is configured transmit the edited specified template to the communication terminal.

14. A server for enabling a communication terminal to receive communication services via a network, the server comprising:

a storing unit operable to store a plurality of combinations of a communication parameter and an identifier of communication software included in a communication device, a receiving unit operable to receive from the communication terminal a request for a communication parameter and an identifier indicative of a name of communication software stored in the communication terminal, an extracting unit operable to extract, from a plurality of communication parameters stored in the storing unit, a communication parameter corresponding to the identifier received by the receiving unit, wherein the communication parameter comprises individual user specific identification information of a user of the mobile phone, and communication software configuration values, and a transmitting unit operable to transmit the extracted communication parameter to the communication terminal, wherein the communication parameter is writeable in the communication software by the communication terminal to enable receipt of communication services by the communication terminal with the communication software via a network.

15. The method according to claim 1, wherein the communication software is executable to provide a connection service for the communication terminal once the communication parameters are written in the predetermined locations.

16. The method according to claim 15, wherein the communication software is executable to provide a dial-up IP connection service.

17. The method according to claim 1, wherein transmitting the extracted communication parameters comprises transmitting an email message that includes the extracted communication parameters.

18. The method according to claim 1, wherein the request includes a software identifier indicative of the communication software stored in the communication terminal.

19. The method according to claim 18, wherein the server uses the software identifier to extract communication parameters that are compatible with the communication software stored in the communication terminal.

* * * * *